April 22, 1958    J. NARVESTAD    2,831,978
DEVICE TO BE USED IN THE RADIOGRAPHY OF TEETH
Filed July 16, 1956

Inventor
Johannes Narvestad
By Pennie, Edmonds, Morton, Barrows & Taylor
Attorneys

United States Patent Office 2,831,978
Patented Apr. 22, 1958

2,831,978

DEVICE TO BE USED IN THE RADIOGRAPHY OF TEETH

Johannes Narvestad, Oslo, Norway

Application July 16, 1956, Serial No. 597,963

6 Claims. (Cl. 250—69)

The invention relates to a device to be used in the radiography of teeth in connection with an X-ray holder, which is placed in the cavity of the patient's mouth.

To obtain the best possible picture of the desired tooth or teeth, the plane of the film should be parallel to a plane through the longitudinal axis of the tooth or teeth, and both planes should be at right angle to the direction of the X-rays. Such a mutual relationship cannot be obtained in practice as the palate prevents the plane through the longitudinal axis of the tooth and the plane through the film from being parallel because the film usually bears against the outer end of the tooth and the palate, thus creating an angle between said two planes. It is therefore proposed that the direction of the X-rays should preferably be at right angle to the dividing line of said angle.

It is not simple to set the said mutual adjustment on free hand and it is an object of the present invention to provide a device which in a simple and plain way simplifies said mutual adjustment of the direction of the X-rays and the film in relation to the tooth or teeth to be radiographed.

The device comprises a film holder formed as a slender plate, e. g. of plastic, with one or more longitudinal slots adapted to hold the X-ray film, the plate in one end having an adjustable sighting cross which is fixable in desired positions.

The device further comprises the feature that the plate has at least two slots which have mutually different inclinations.

The device still further comprises the fact that the plate is wedge-shaped in longitudinal section.

The device finally comprises the feature that the ray-limiting tube of the X-ray tube has a longitudinal and a transversal sighting rib or groove adapted to cooperate with the sighting cross of the film holder.

The invention may be better understood from the following description read in conjunction with the accompanying drawing, in which.

Figure 1:
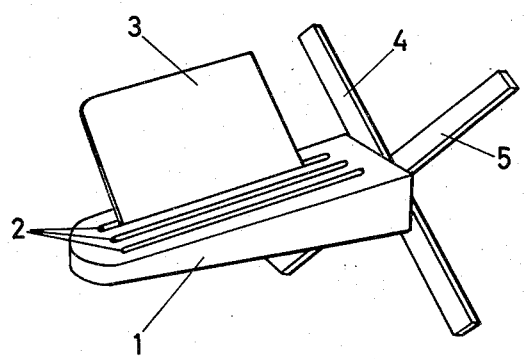
Fig. 1 shows a perspective view of an X-ray film holder with a sighting cross according to the present invention.
Figure 2:
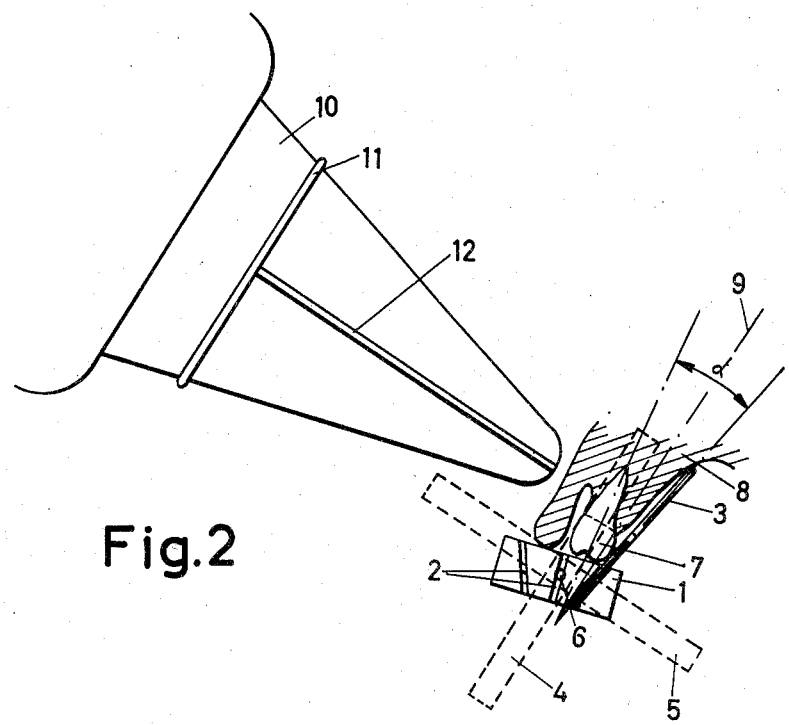
Fig. 2 shows diagrammatically the mutual relationship between ray limiting tube of the X-ray tube, the film holder with film and sighting cross, and the tooth to be radiographed.

The film holder 1, which is made of plastic has a slender and wedgelike shape and has three longitudinal through-slots 2, which have mutual different inclinations as shown in Fig. 2. In the thickest end the holder 1 is provided with a sighting cross 4, 5, which by means of a screw 6 may be fixed in a desired position in a plane at right angle to the plane of the film 3. Fig. 2 shows the holder 1 with fastened film 3 bearing against the outer end of a tooth 7, which is to be radiographed, and the palate 8. A plane through the film and a plane through the longitudinal axis of the tooth form an angle α between them. After the holder is placed in the cavity of the patient's mouth, the sighting cross is adjusted in such a way that one of its legs 4 extends substantially parallel to the dividing line 9 of said angle α and the cross is fixed in this position by means of a screw 6. Then it is very simple to set the conical ray-limiting tube 10 of the X-ray tube, which tube being provided with a longitudinal sighting rib 12, parallel to the leg 5 on the sighting cross and the transverse sighting rib 11 parallel to the visible part of the outer edge of the holder 1.

It should be stressed that the invention is not limited to be used only by dentists, but may be used for corresponding objects where radiography is used.

I claim:

1. A device for use in the radiography of teeth including an X-ray film holder to be inserted into the cavity of a patient's mouth, the device comprising an X-ray film holder in the form of a slender plate one end of which is adapted to extend into the patient's mouth, at least one longitudinal slot in the film holder plate adapted to hold an X-ray film adjacent a tooth, and an adjustable sighting cross mounted at the other end of the film holder plate, said cross being rotatable relative to the film holder plate for setting one of the legs of the cross in a selected position with respect to the axis of the tooth thereby indicating the sighting angle for the conical ray-limiting tube of an X-ray apparatus.

2. A device as claimed in claim 1, in which the film holder plate is provided with at least two longitudinal slots having different inclinations.

3. A device as claimed in claim 1, in which the film holder plate is wedge-shaped in longitudinal section and in which the sighting cross is mounted on the end of greater thickness.

4. A device for use in the radiography of teeth including an X-ray film holder to be inserted into the cavity of a patient's mouth, the device comprising an X-ray film holder in the form of a slender plate one end of which is adapted to extend into the patient's mouth, at least one longitudinal slot in the film holder plate adapted to hold an X-ray film adjacent a tooth, and an adjustable sighting cross member having legs crossing each other at an intersection, the sighting cross member being mounted at the other end of the film holder plate in a plane at a right angle to the plane of the slot and being rotatable on a pivot at the intersection of the legs relative to the film holder plate for setting one of the legs of the cross in a selected position with respect to the axis of the tooth, whereby the other leg is set to indicate the sighting angle for the conical ray-limiting tube of an X-ray apparatus.

5. In an apparatus for X-raying teeth including an X-ray film holder to be inserted into the cavity of a patient's mouth having the form of a slender plate one end of which is adapted to extend into the patient's mouth, at least one longitudinal slot in the film holder plate adapted to hold an X-ray film adjacent a tooth, an adjustable sighting cross member having legs crossing each other at an intersection, the sighting cross member being mounted at the other end of the film holder plate in a plane at a right angle to the plane of the slot and being rotatable on a pivot at the intersection of the legs relative to the film holder plate for setting one of the legs of the cross in a selected angular position with respect to the axis of the tooth thereby setting the other leg to indicate the sighting angle for the ray-limiting tube of an X-ray apparatus, and an X-ray-limiting tube provided with a longitudinal sighting member adapted to be used in cooperation with said other leg of the cross member for aiming said tube.

6. An apparatus as claimed in claim 5, in which the X-ray tube is provided with a transverse sighting member for use in cooperation with said one leg of the cross member to aid in aiming said tube.

References Cited in the file of this patent

UNITED STATES PATENTS

| | | |
|---|---|---|
| 1,398,247 | Wallace | Nov. 29, 1921 |
| 2,753,461 | Goldberg | July 3, 1956 |